(12) United States Patent
Mo et al.

(10) Patent No.: US 12,476,673 B2
(45) Date of Patent: Nov. 18, 2025

(54) GROUP PARTITIONING IN A MULTI-USER MIMO SYSTEM

(71) Applicant: Samsung Electronics Co., Ltd., Suwon-si (KR)

(72) Inventors: Jianhua Mo, Allen, TX (US); Young Han Nam, Plano, TX (US); Ahmad AlAmmouri, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/399,550

(22) Filed: Dec. 28, 2023

(65) Prior Publication Data

US 2024/0250723 A1    Jul. 25, 2024

Related U.S. Application Data

(60) Provisional application No. 63/440,329, filed on Jan. 20, 2023.

(51) Int. Cl.
*H04L 23/02* (2006.01)
*H04B 7/0452* (2017.01)
*H04B 7/06* (2006.01)

(52) U.S. Cl.
CPC ......... *H04B 7/0452* (2013.01); *H04B 7/0626* (2013.01)

(58) Field of Classification Search
CPC .. H04B 7/0417; H04B 7/0478; H04B 7/0452; H04L 1/0054; H04L 1/005; H04W 4/023; H04W 72/042
USPC ........................................ 375/262, 260, 267
See application file for complete search history.

(56) References Cited

U.S. PATENT DOCUMENTS

| | | |
|---|---|---|
| 11,115,088 B2 | 9/2021 | Jakobsson et al. |
| 11,621,761 B2 | 4/2023 | Raghavan et al. |
| 11,646,773 B2 | 5/2023 | Forenza et al. |
| 2020/0059276 A1 | 2/2020 | Monir Vaghefi et al. |
| 2021/0111767 A1* | 4/2021 | Benjebbour .......... H04W 16/28 |
| 2021/0320698 A1 | 10/2021 | Sharafat et al. |
| 2022/0209834 A1 | 6/2022 | Kovacic |
| 2022/0278875 A1 | 9/2022 | Tsui |
| 2023/0062380 A1 | 3/2023 | Abdelghaffar et al. |

(Continued)

FOREIGN PATENT DOCUMENTS

| | | |
|---|---|---|
| CN | 109274411 A | 1/2019 |
| CN | 112039565 A | 12/2020 |
| WO | 2022214169 A1 | 10/2022 |

OTHER PUBLICATIONS

Rajashekar, R., et al., "Performance Analysis of Antenna Selection Algorithms in Spatial Modulation Systems with Imperfect CSIR", European Wireless 2013, 19th European Wireless Conference, 2013, 5 pages.

(Continued)

*Primary Examiner* — Khai Tran

(57) ABSTRACT

A method includes logically partitioning an antenna panel of a base station into multiple subpanels. The method also includes identifying multiple user groups for multi-user multiple-input multiple-output (MU-MIMO) spatial multiplexing, each user group comprising one or more user equipments (UEs). The method also includes assigning the user groups to the subpanels. The method also includes transmitting to the UEs via the subpanels, wherein each user group is served by one subpanel of the multiple subpanels.

20 Claims, 13 Drawing Sheets

(56) References Cited

U.S. PATENT DOCUMENTS

2023/0188279 A1    6/2023   Abotabl et al.
2024/0056161 A1*   2/2024   Ankel .................. H04L 5/0048
2024/0204830 A1*   6/2024   Pjanic .............. H04L 25/03891
2024/0243791 A1*   7/2024   Huang .................. H04B 7/063
2024/0373436 A1*  11/2024   Nam .................... H04W 72/23

OTHER PUBLICATIONS

Jeon, Y., et al., "New Beamforming Designs for Joint Spatial Division and Multiplexing in Large-Scale MISO Multi-User Systems", IEEE Transactions on Wireless Communications, vol. 16, No. 5, May 2017, 13 pages.

International Search Report and Written Opinion issued Apr. 22, 2024 regarding International Application No. PCT/KR2024/000781, 10 pages.

\* cited by examiner

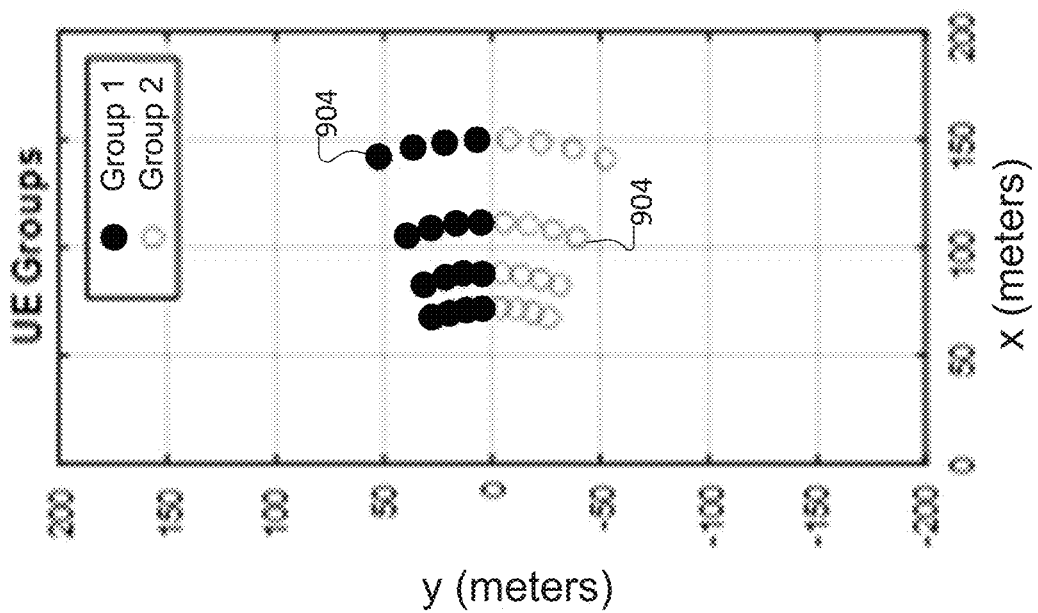
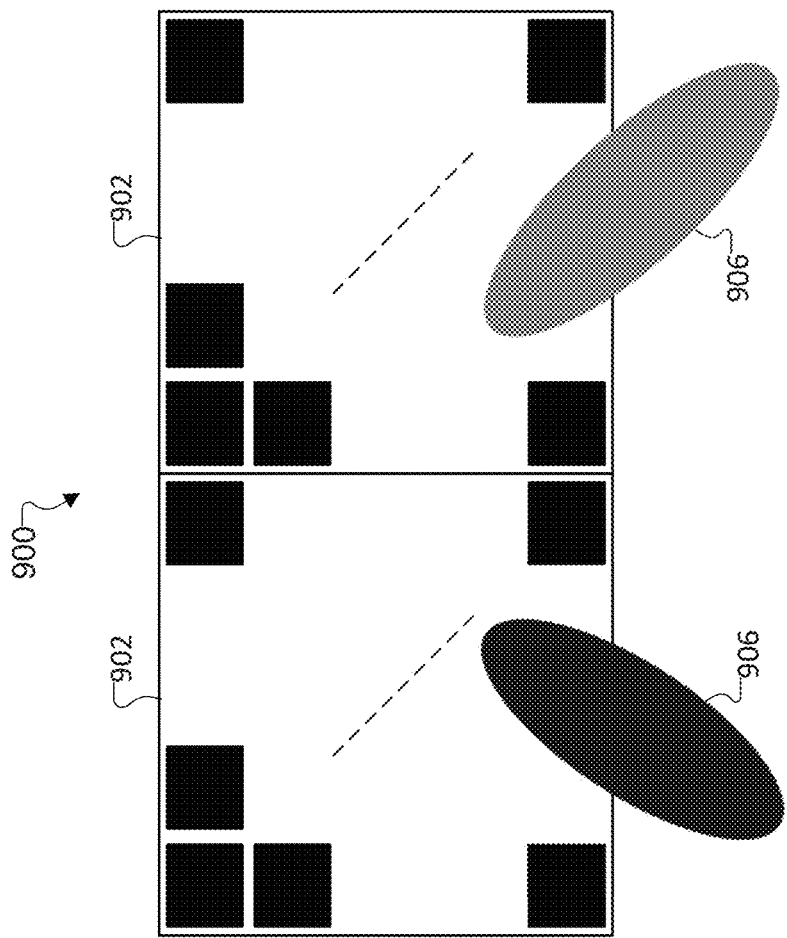
FIG. 9

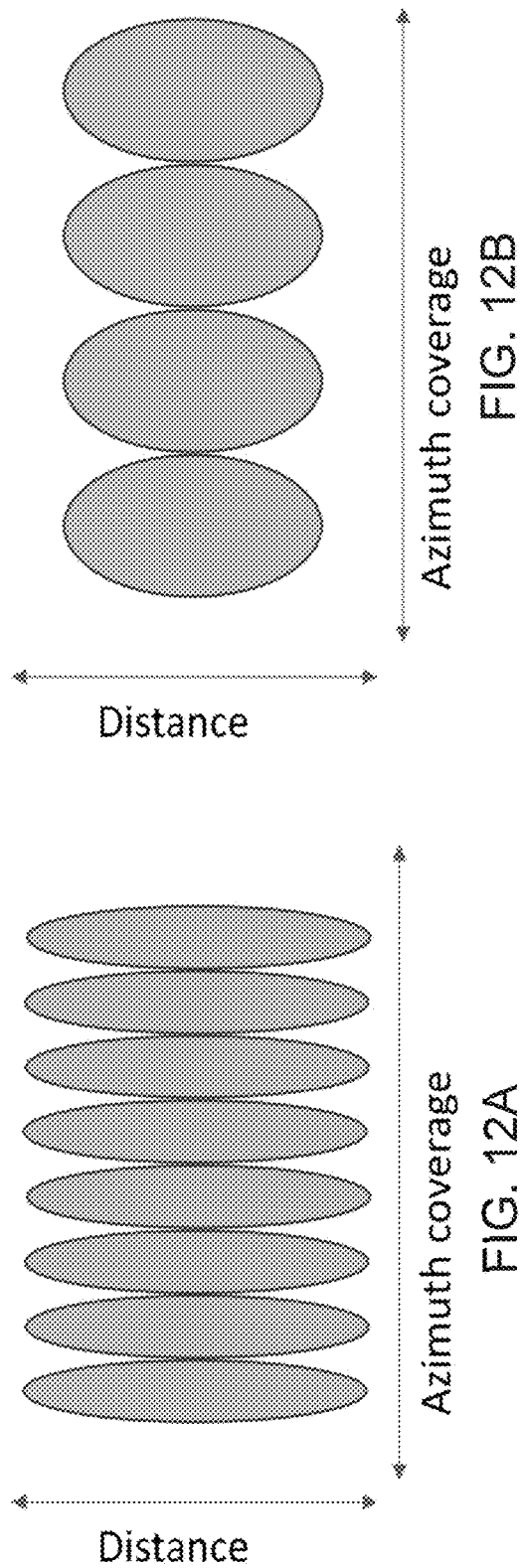
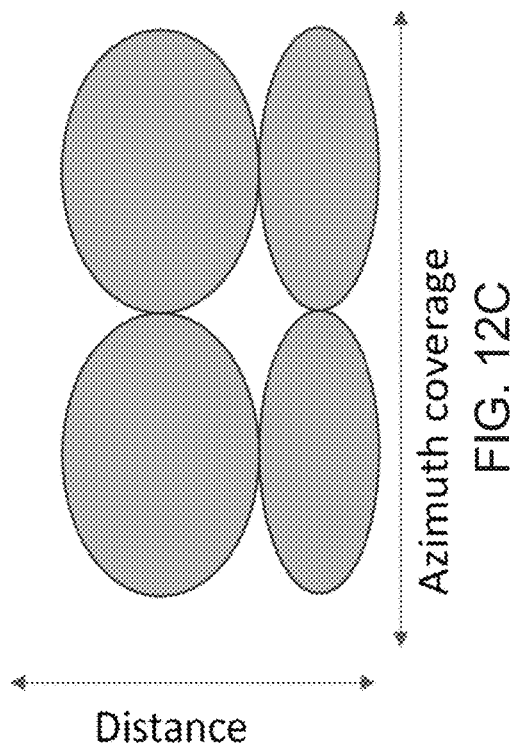

GROUP PARTITIONING IN A MULTI-USER MIMO SYSTEM

CROSS-REFERENCE TO RELATED APPLICATIONS AND CLAIM OF PRIORITY

The present application claims priority to U.S. Provisional Patent Application Ser. No. 63/440,329 filed on Jan. 20, 2023. The content of the above-identified patent document is incorporated herein by reference.

TECHNICAL FIELD

The present disclosure relates generally to wireless communication systems and, more specifically, the present disclosure relates to a method and apparatus for group partitioning in a multi-user multiple-input multiple-output (MIMO)) system.

BACKGROUND

As wireless communication standards continue to evolve, it is expected that 5G-advanced or 6G base stations will support high order multi-user multiple-input multiple-output (MU-MIMO), for example, 16-layer or 32-layer MU-MIMO. Higher order MU-MIMO can provide higher spectral efficiency and higher beamforming gain for better power efficiency. One example of MU-MIMO is X-MIMO, which operates in the upper mid-band (i.e., 7-24 GHz). As the number of MU-MIMO layers increases, the computational complexity increases significantly.

SUMMARY

The present disclosure relates to wireless communication systems and, more specifically, the present disclosure relates to a method and apparatus for group partitioning in a multi-user MIMO system.

In one embodiment, a method includes logically partitioning an antenna panel of a base station into multiple subpanels. The method also includes identifying multiple user groups for multi-user multiple-input multiple-output (MU-MIMO) spatial multiplexing, each user group comprising one or more user equipments (UEs). The method also includes assigning the user groups to the subpanels. The method also includes transmitting to the UEs via the subpanels, wherein each user group is served by one subpanel of the multiple subpanels.

In another embodiment, a device includes a transceiver and a processor operably connected to the transceiver. The processor is configured to: logically partition an antenna panel of a base station into multiple subpanels; identify multiple user groups for MU-MIMO spatial multiplexing, each user group comprising one or more UEs; assign the user groups to the subpanels; and control the base station to transmit to the UEs via the subpanels, wherein each user group is served by one subpanel of the multiple subpanels.

In yet another embodiment, a non-transitory computer readable medium includes program code that, when executed by a processor of a device, causes the device to: logically partition an antenna panel of a base station into multiple subpanels; identify multiple user groups for MU-MIMO spatial multiplexing, each user group comprising one or more UEs; assign the user groups to the subpanels; and control the base station to transmit to the UEs via the subpanels, wherein each user group is served by one subpanel of the multiple subpanels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates an example of two wide beams transmitted by two subpanels according to embodiments of the present disclosure;

FIGS. 12A-12C illustrate various example analog beam coverage zones with minimal or no overlap according to embodiments of the present disclosure;

DETAILED DESCRIPTION

Figure 1:
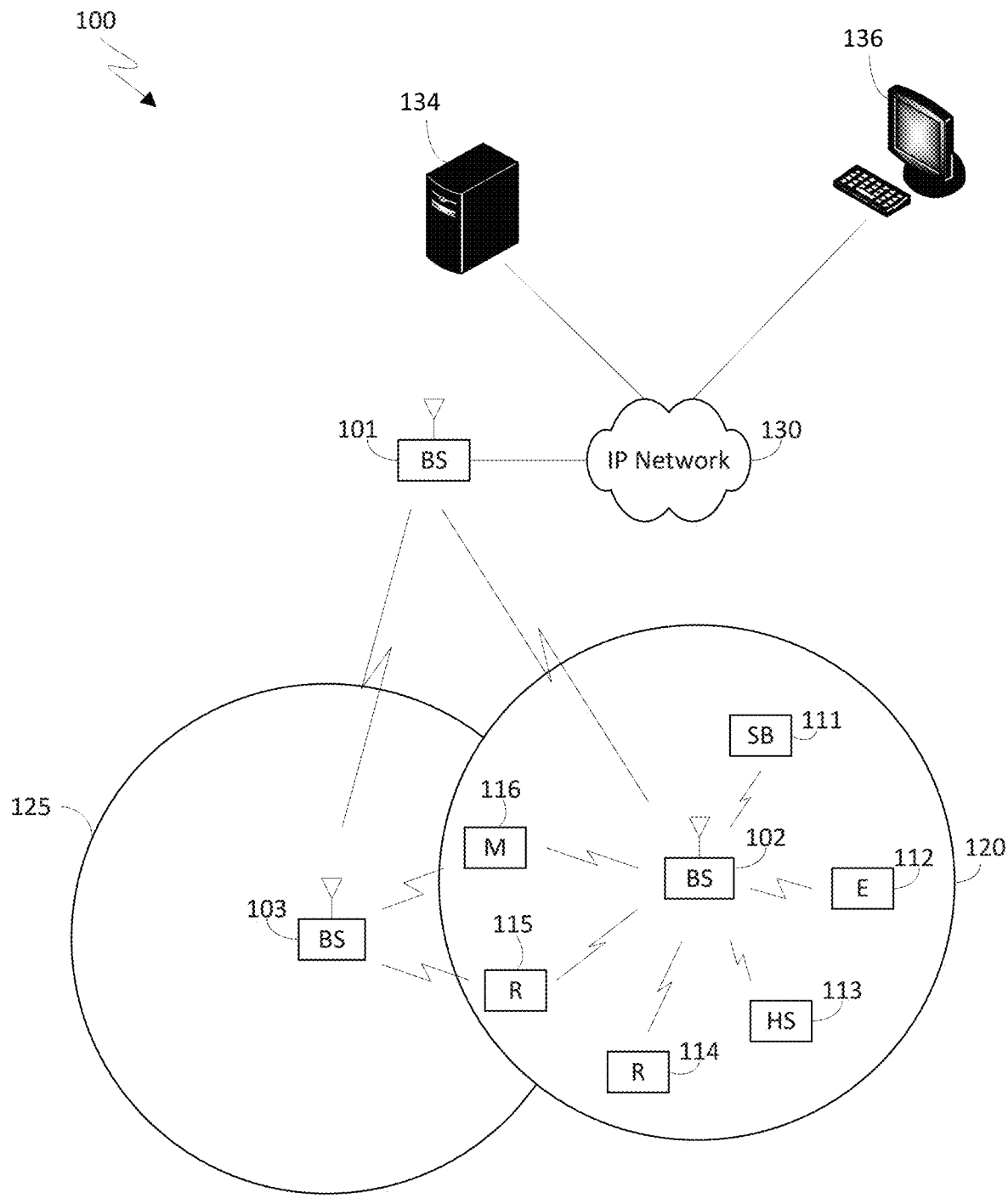
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
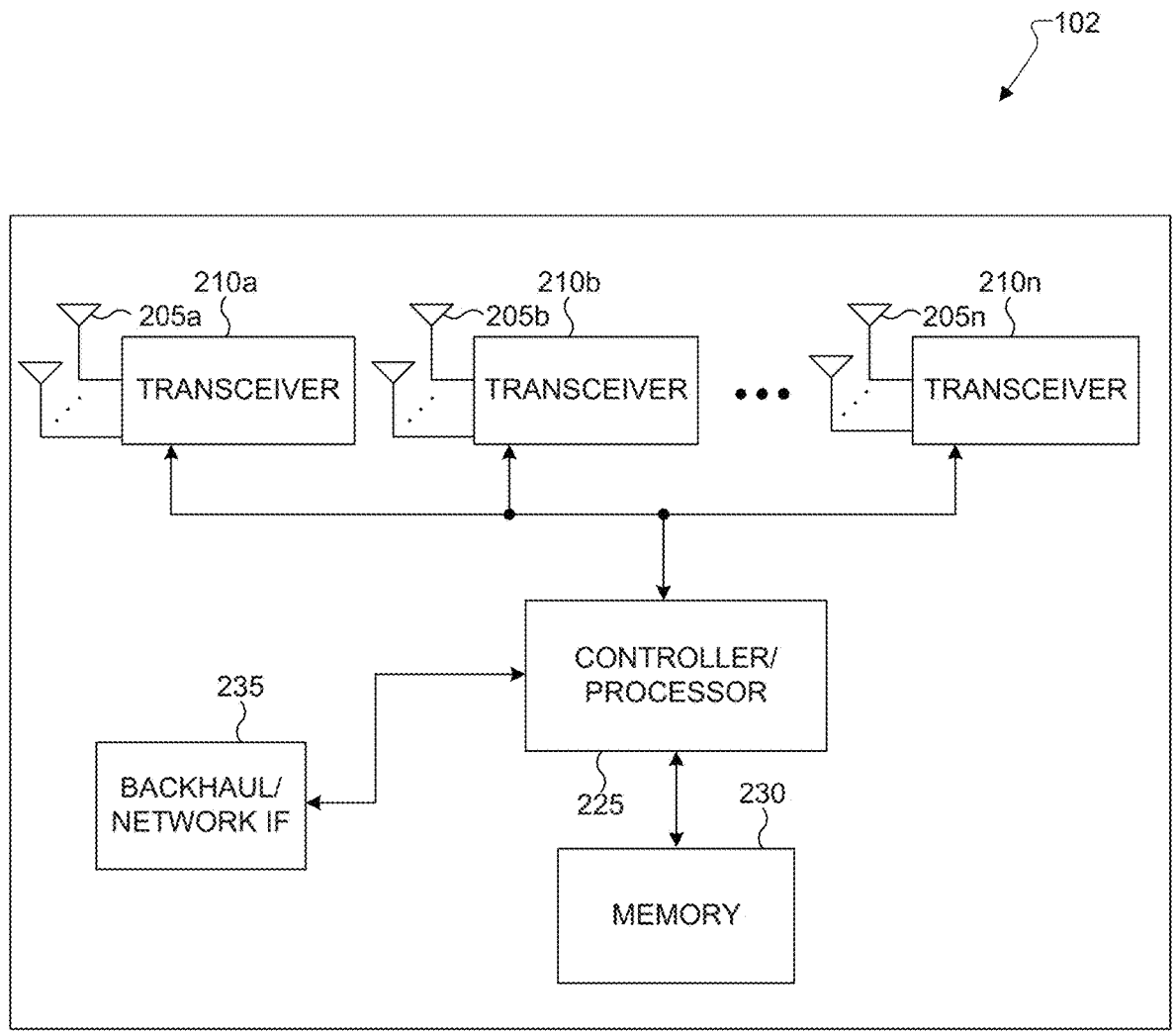
FIG. 2 illustrates an example gNB according to embodiments of the present disclosure.
Figure 3:
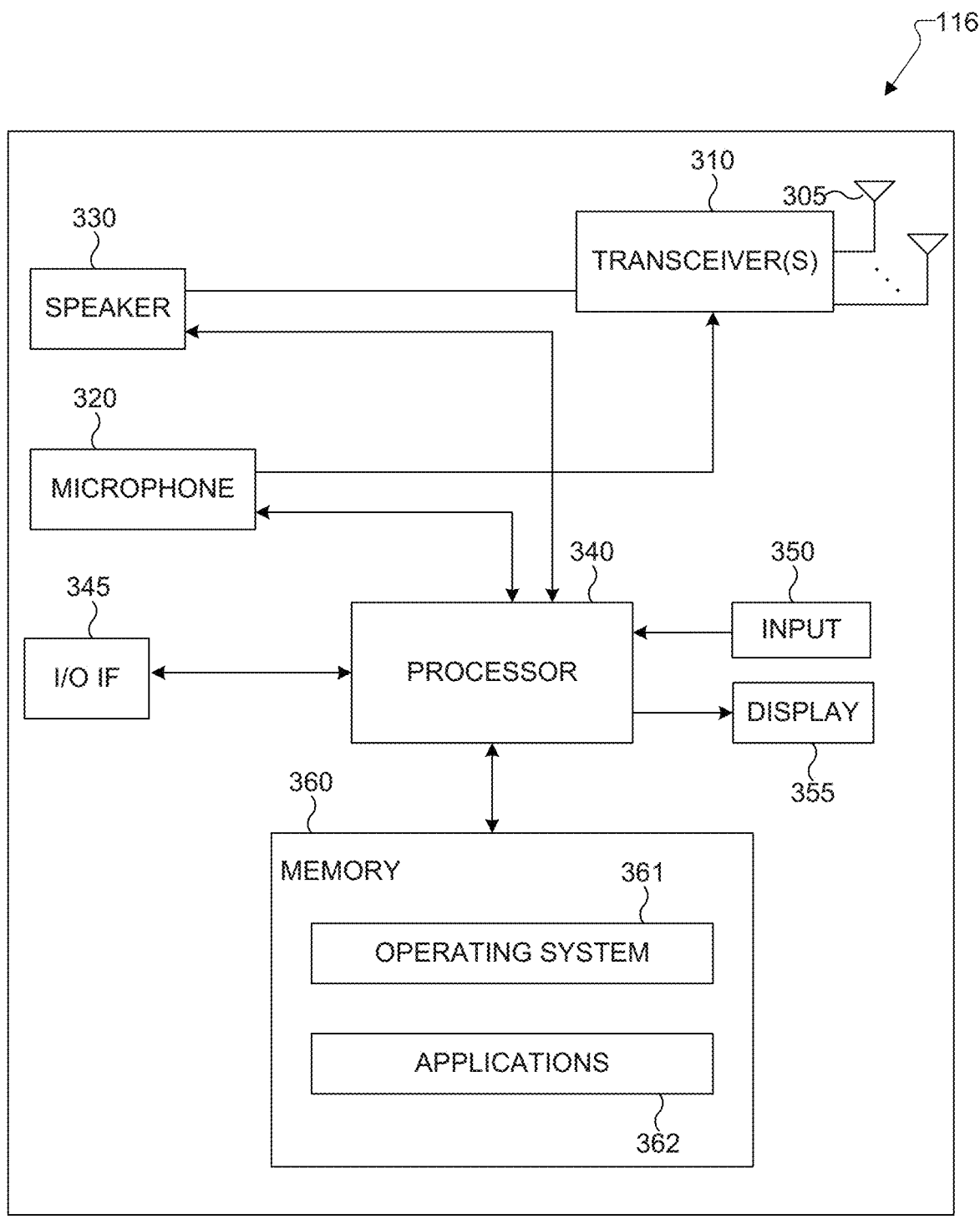
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a Wifi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

In some embodiments, the network 130 facilitates communications between at least one server 134 and various client devices, such as a client device 136. The server 134 includes any suitable computing or processing device that can provide computing services for one or more client devices. The server 134 could, for example, include one or more processing devices, one or more memories storing instructions and data, and one or more network interfaces facilitating communication over the network 130.

The client device 136 represents any suitable computing or processing device that interacts with at least one server or other computing device(s) over the network 130. In this example, the client device is represented as a desktop computer, but other examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device 136 could communicate directly with the network 130 or indirectly with the network 130 via any suitable intermediate device(s) or network(s).

As described in more detail below, a computing device, such as the server 134 or the client device 136, may perform operations in connection with beam management. For example, the server 134 or the client device 136 may perform operations in connection with group partitioning in a multi-user MIMO system as discussed herein.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support group partitioning in a multi-user MIMO system as discussed herein. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for group partitioning in a multi-user MIMO system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 (which includes for example, a touchscreen, keypad, etc.) and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
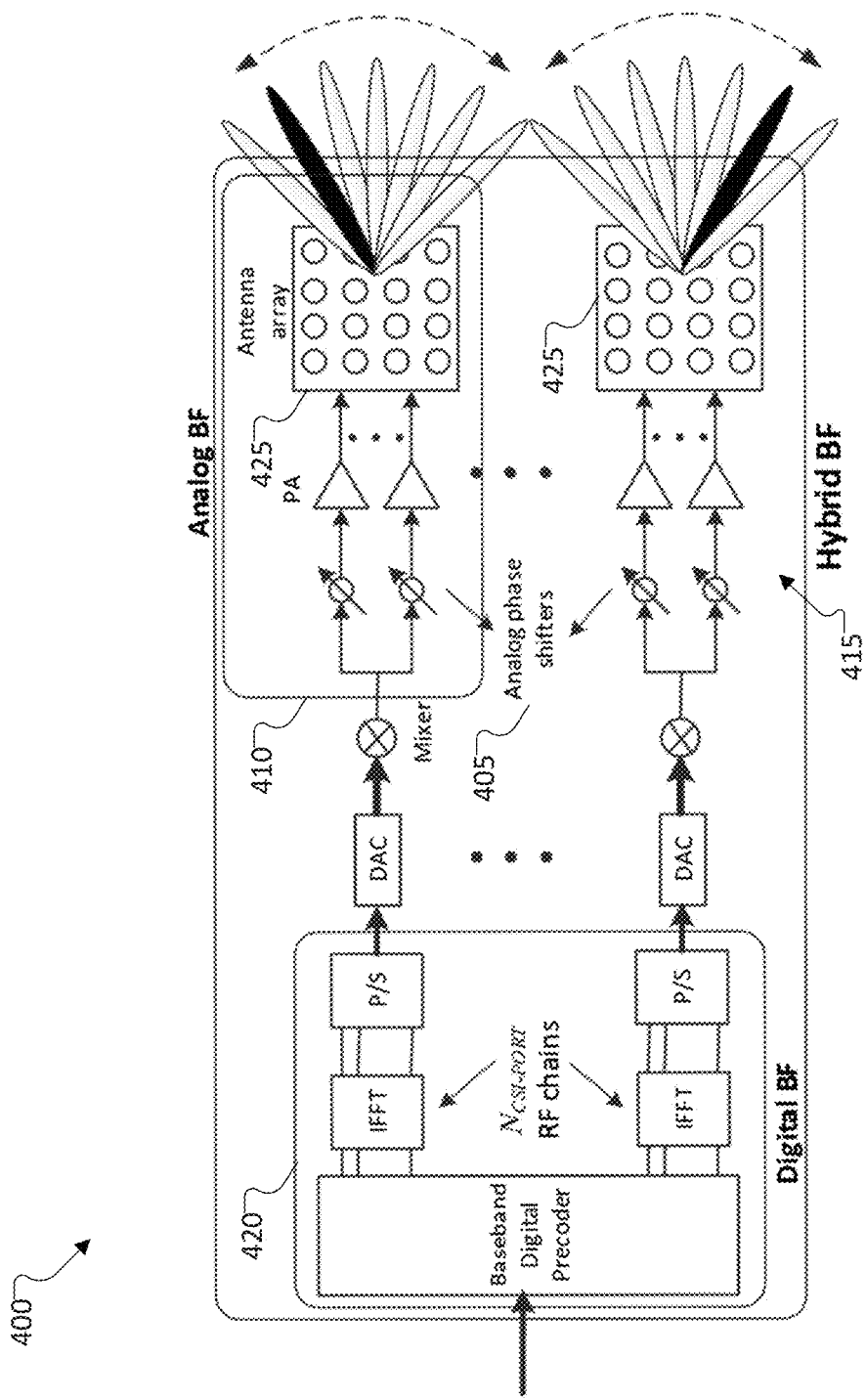
FIG. 4 illustrates an example beamforming architecture according to embodiments of the present disclosure.

FIG. 4 illustrates an example beamforming architecture 400 according to embodiments of the present disclosure. The embodiment of the beamforming architecture 400 illustrated in FIG. 4 is for illustration only. FIG. 4 does not limit the scope of this disclosure to any particular implementation of the beamforming architecture 400. In certain embodiments, one or more of gNB 102 or UE 116 can include the beamforming architecture 400. For example, one or more of antenna 205 and its associated systems or antenna 305 and its associated systems can be configured the same as or similar to the beamforming architecture 400.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mm Wave frequencies)).

In the example shown in FIG. 4, the beamforming architecture 400 includes analog phase shifters 405, an analog beamformer (BF) 410, a hybrid BF 415, a digital BF 420, and one or more antenna arrays 425. In this case, one CSI-RS port is mapped onto a large number of antenna elements in antenna arrays 425, which can be controlled by the bank of analog phase shifters 405. One CSI-RS port can then correspond to one sub-array which produces a narrow analog beam through analog beamforming by analog BF 410. The analog beam can be configured to sweep across a wider range of angles by varying the phase shifter bank 405 across symbols or subframes. The number of sub-arrays (equal to the number of RF chains) is the same as the number of CSI-RS ports NCSI-PORT. The digital BF 420 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 400 is also applicable to higher frequency bands such as >52.6 GHz (also termed the FR4). In this case, the beamforming architecture 400 can employ only analog beams. Due to the O2 absorption loss around 60 GHz frequency (~10 decibels (dB) additional loss @100 m distance), larger numbers of and sharper analog beams (hence larger number of radiators in the array) will be needed to compensate for the additional path loss.

As discussed above, 5G-advanced and 6G base stations are expected to support high order MU-MIMO, for example, 16-layer or 32-layer MU-MIMO. High order MU-MIMO can provide higher spectral efficiency and higher beamforming gain for better power efficiency. One example of MU-MIMO is X-MIMO, which operates in the upper mid-band (i.e., 7-24 GHZ). For example, 6G X-MIMO operates in the 13 GHz band.

As the number of MU-MIMO layers increases, the computational complexity increases significantly. For example, for the zero-forcing precoding, the matrix inversion computation cost is $O(N_{layer}^3)$, which increases eight times if the number of layers $N_{layer}$ doubles. The high computational complexity presents a challenge for the deployment of high-order MU-MIMO systems.

In addition to computational complexity, another challenge for MU-MIMO is energy efficiency. Extremely large antenna panels will be adopted in the 5G-advanced and 6G standards. The massive MIMO radio units can consume large amounts of energy, especially the power amplifier, the digital front end, and digital processing integrated circuits.

To address these and other issues, this disclosure provides systems and methods for group partitioning in a multi-user MIMO system. As described in greater detail below, the disclosed embodiments logically partition a large antenna panel into multiple subpanels. The disclosed embodiments also select groups of UEs for MU-MIMO spatial multiplexing, and assign the user groups to the subpanels. Once the assignment has been made, the subpanels can transmit and receive data to and from the assigned UEs. The disclosed embodiments provide a low complexity method for high-order MU-MIMO. In addition, the disclosed embodiments provide an energy efficient solution for extremely large MIMO.

Some of the embodiments discussed below are described in the context of X-MIMO systems operating at the 13 GHz frequency band. Of course, these are merely examples. It will be understood that the principles of this disclosure may be implemented in any number of other types of systems with other frequency bands.

Figure 5:
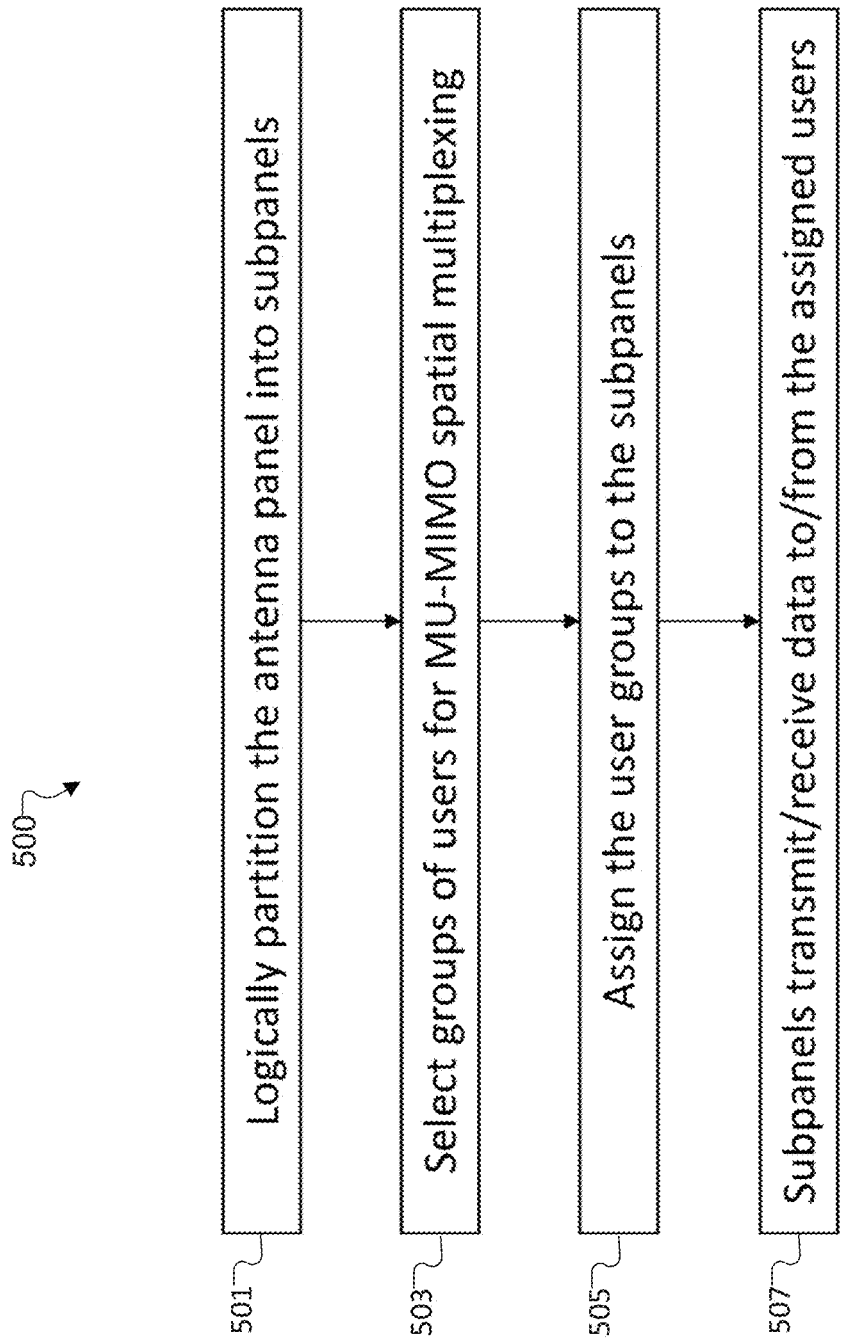
FIG. 5 illustrates an example process for group partitioning in a MU-MIMO system according to embodiments of the present disclosure.

FIG. 5 illustrates an example process 500 for group partitioning in a MU-MIMO system according to various embodiments of the present disclosure. The embodiment of the process 500 shown in FIG. 5 is for illustration only. Other embodiments of the process 500 could be used without departing from the scope of this disclosure. For ease of explanation, the process 500 will be described as being implemented using the BS 102 of FIG. 1. However, the process 500 could be implemented in any other suitable device.

Figure 6:
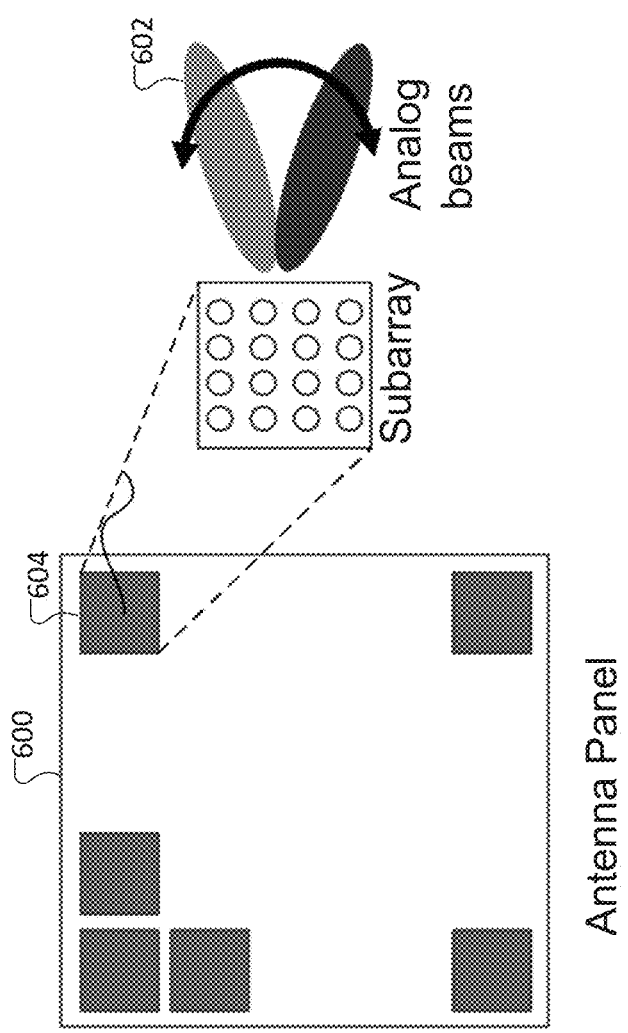
FIG. 6 illustrates an example architecture for an antenna panel of a base station according to embodiments of the present disclosure.

As shown in FIG. 5, the process 500 includes operation 501, in which the BS 102 logically partitions its antenna panel into multiple subpanels. In some embodiments, the BS 102 logically divides the whole antenna panel into multiple subpanels, where each subpanel covers a specific spatial region. FIG. 6 illustrates an example architecture for an antenna panel 600 of the BS 102 according to various embodiments of the present disclosure. As shown in FIG. 6, the antenna panel 600 includes multiple (e.g., 256) digital chains, each capable of forming tunable analog beams 602 across a sub-array 604. In some embodiments, each sub-array 604 is a sixteen element sub-array, meaning that each sub-array 604 includes sixteen antenna elements. However, this is merely one example; other sub-array sizes are possible and within the scope of this disclosure.

Figure 7C:
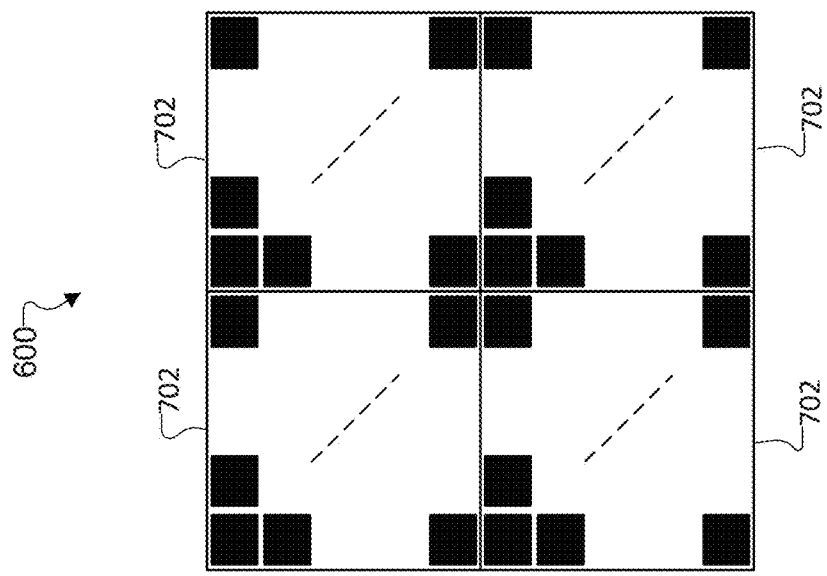
FIGS. 7A-7C illustrate three example partitions of an antenna panel according to embodiments of the present disclosure.
Figure 7B:
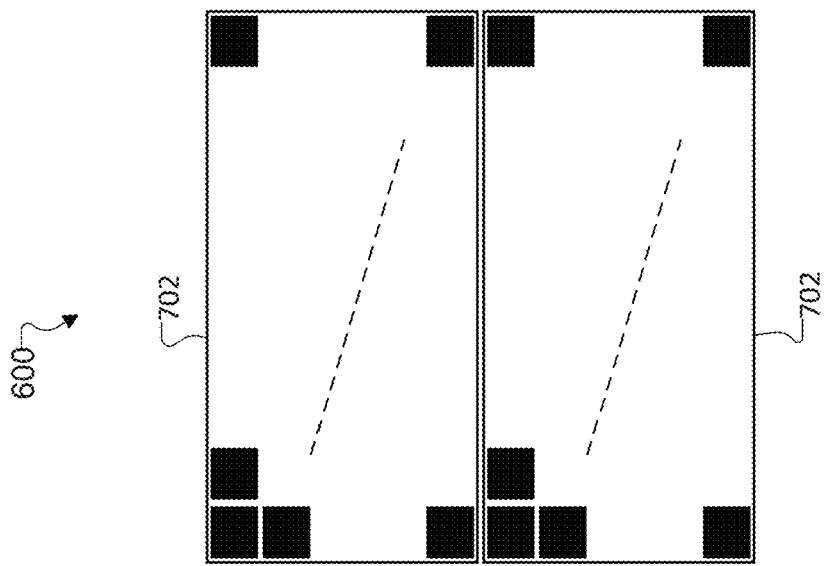
Figure 7A:
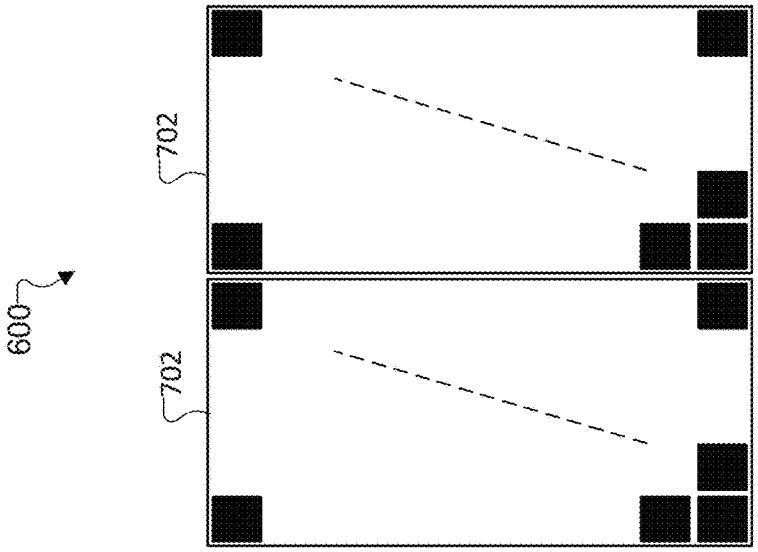

In operation 501, the antenna panel 600 could be partitioned horizontally, vertically, or both. For example, FIGS. 7A-7C illustrate three example partitions of the antenna panel 600 according to various embodiments of the present disclosure. As shown in FIG. 7A, the antenna panel 600 is divided horizontally into two subpanels 702. In FIG. 7B, the antenna panel 600 is divided vertically into two subpanels 702. In FIG. 7C, the antenna panel 600 is divided both horizontally and vertically into four subpanels 702. It is noted that multiple partitions may be made in the horizontal direction, the vertical direction, or both, such that more than two subpanels 702 may span a dimension of the antenna panel 600. For example, the antenna panel 600 could be partitioned into six subpanels 702 (three horizontally by two vertically). As another example, the antenna panel 600 could be partitioned into fifteen subpanels 702 (three horizontally by five vertically). It is also noted that the partition of the antenna panel 600 could be either fixed or time-varying, depending on the UE distributions and implementation overhead. The spatial regions could be sub-sectors with minimal spatial overlap to minimize the inter-subpanel interference.

The process 500 also includes operation 503, in which the BS 102 selects user groups for MIMO multiplexing. Each user group is a cluster of one or more UEs (such as UEs 116). In some embodiments, the BS 102 selects multiple user groups for MU-MIMO multiplexing such that inter-group interference (i.e., interference between the UEs of different user groups) is small. In some embodiments, the BS 102 selects the number of user groups to be less than or equal to the number of subpanels 702 identified in operation 501.

Figure 8:
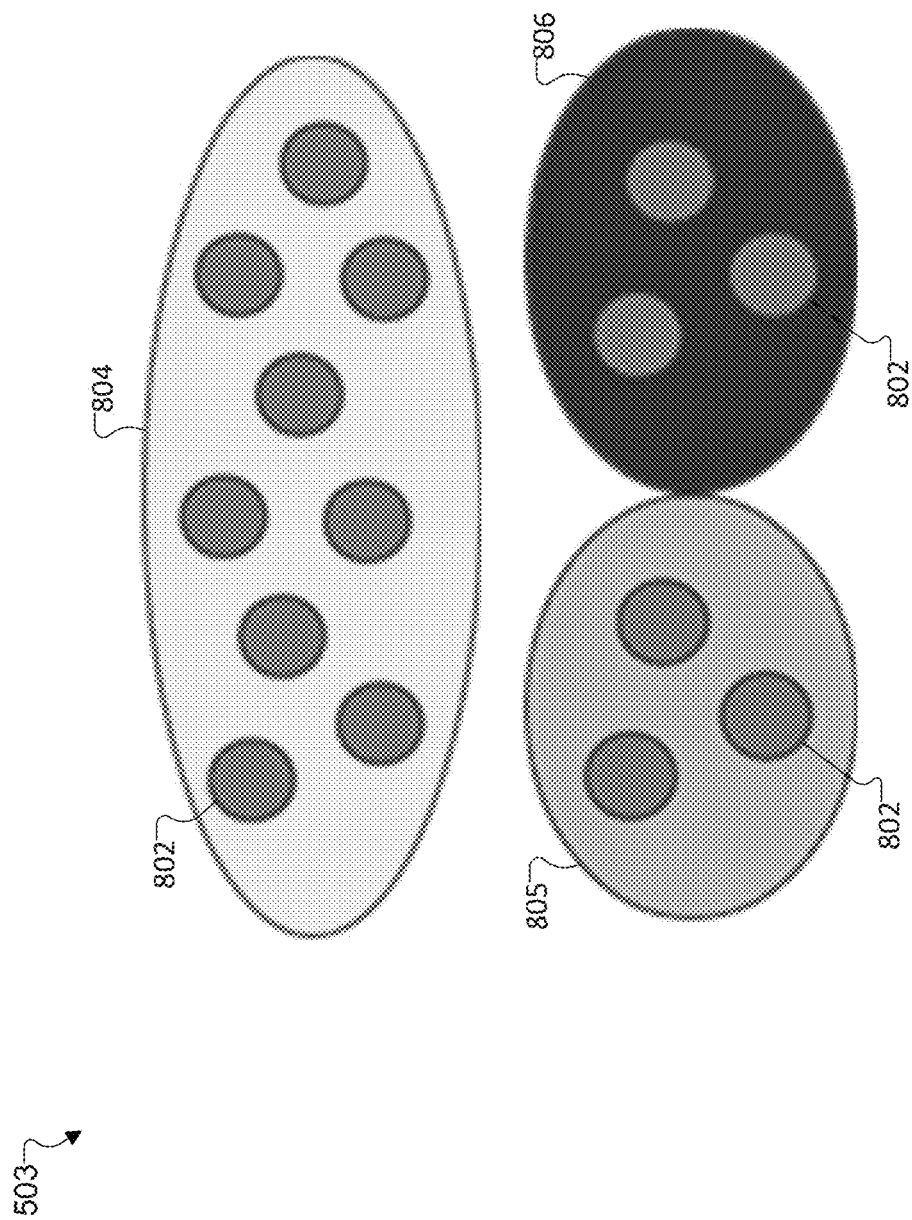
FIG. 8 illustrates an example of UEs arranged into user groups for MIMO multiplexing according to embodiments of the present disclosure.

FIG. 8 illustrates an example of UEs arranged into user groups for MIMO multiplexing according to various embodiments of the present disclosure. As shown in FIG. 8, multiple UEs 802 (which can represent UEs 116) are arranged into three user groups 804-806. The BS 102 selects the UEs 802 for each user group 804-806 such that there is clear separation between the user groups 804-806, in order to reduce the inter-group interference. In some embodiments, the BS 102 selects the UEs 802 for each user group 804-806 based on a distance between each UE 802 and the BS 102, an azimuth angle of each UE 802 with respect to the BS 102, or both. For example, the BS 102 selects the UEs 802 with similar distances to the BS 102 (e.g., short distance for the cell-center UEs, or long distance for the cell-edge UEs), similar azimuth angles with respect to the BS 102 (e.g., on the left side of the BS 102 or the on the right side of the BS 102), or both similar distances and similar azimuth angles, and groups those UEs 802 together into one user group 804-806. As shown in FIG. 8, the number of UEs 802 can vary among user groups 804-806. For example, the user group 804 includes nine UEs 802, while the user groups 805 and 806 each include three UEs 802.

In some embodiments, the BS 102 estimates the user channel by transmitting and receiving reference signals (e.g., SSB, CSI-RS, SRS signals) with multiple wide beams (i.e., wide beam sweeping), and the UEs are grouped based on their best wide beams. For example, if the antenna panel 600 is partitioned horizontally into two subpanels 702 (such as shown in FIG. 7A), the BS 102 could form two wide beams, pointing to the left and right side of the 120-degree sector with the two subpanels 702, and group the UEs according to either the received signal strength from the two wide beams, or the best wide beam index reported by the UEs.

FIG. 9 illustrates an example of two wide beams transmitted by two subpanels according to various embodiments of the present disclosure. As shown in FIG. 9, an antenna panel 900 is partitioned to include multiple subpanels 902. It is assumed that the BS 102 is located at the location (x=0, y=0) and the boresight direction is along the x-axis. The UEs 904 with y>0 (i.e., the UEs 904 on the left side of the BS 102) are grouped as Group 1, and the UEs 904 with y<0 (i.e., the UEs 904 on the right side of the BS 102) are grouped as Group 2.

In some embodiments, the BS 102 configures and transmits multiple CSI-RS resources via wide beams 906, which are transmitted from the subpanels 902. For example, the BS 102 can transmit one CSI-RS resource per wide beam 906 for the UEs 904 to measure the RSRPs. The UEs 904 report the best CSI-RS resource index along with the RSRP value, so that the BS 102 can associate each UE 904 with a certain subpanel 902. As another option, SSBs can be used alternatively to CSI-RS resources.

Figures 10, 11:
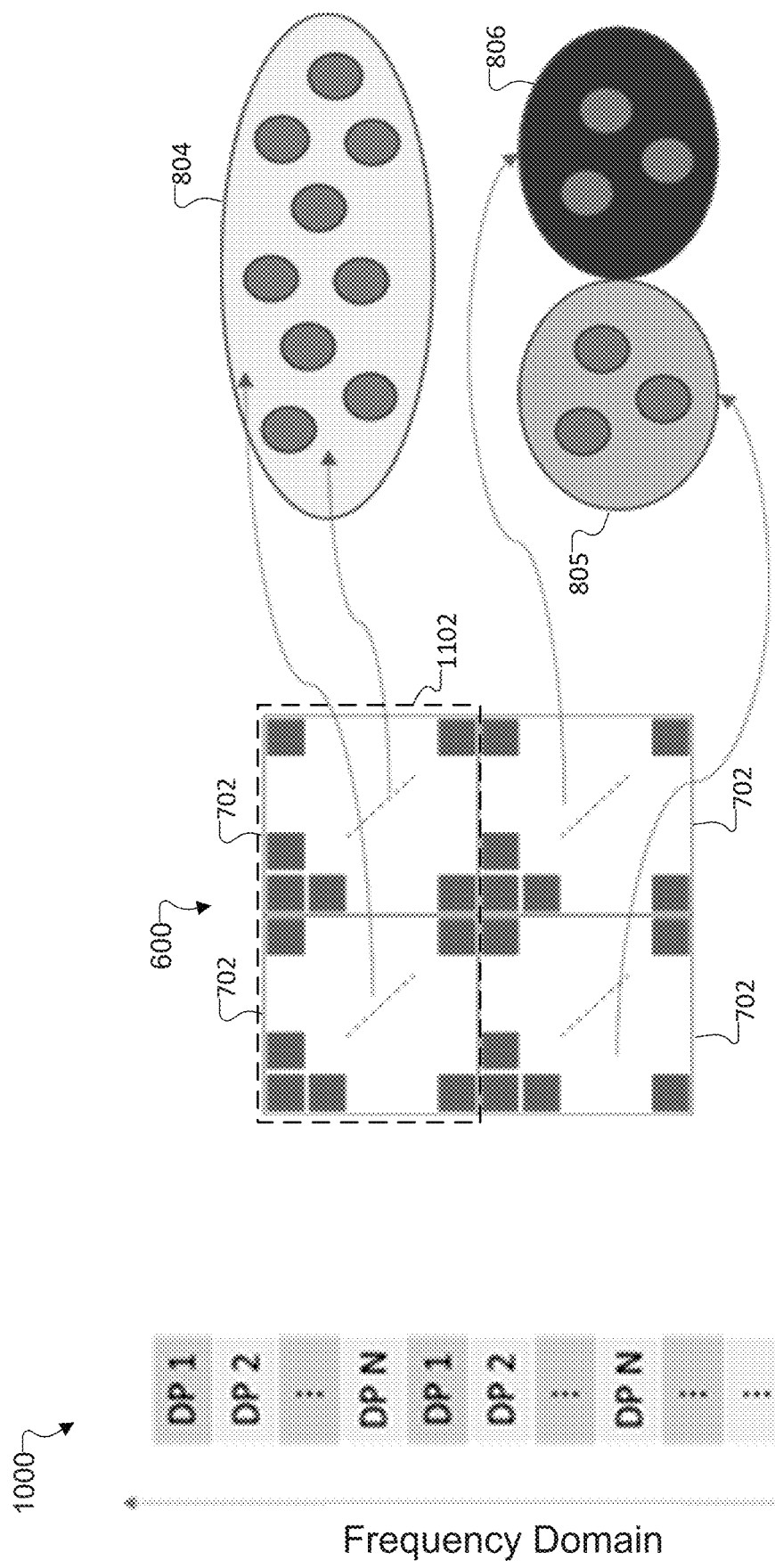
FIG. 10 illustrates an example of frequency-multiplexed digital ports according to embodiments of the present disclosure.
FIG. 11 illustrates an example of assignment of user groups to subpanels according to embodiments of the present disclosure.

In other embodiments, the BS 102 configures and transmits a reference signal (e.g., SSB, CSI-RS, or the like) of a single antenna port for analog beam measurement for each UE. In one example, if an antenna panel has 128 digital ports and each digital port is connected to one or several power amplifiers (PAS), then 128 power levels of PAs (or PA groups) can be digitally controlled. FIG. 10 illustrates an example 1000 of frequency-multiplexed digital ports according to various embodiments of the present disclosure. In FIG. 10, N digital ports (DPs) are multiplexed in the frequency domain. Compared to using a single digital port in all frequency bands, the power spectral density increases by N times, thus the cell coverage is extended.

Turning again to FIG. 5, the process 500 also includes operation 505, in which the BS 102 assigns the user groups to the subpanels. In some embodiments, the BS 102 assigns the user groups to the subpanels taking into account the distribution of the UEs and the shape of the subpanels. For example, a wide subpanel is able to support more UEs in the horizontal direction, while a tall subpanel is able to differentiate more UEs in the vertical direction. Multiple subpanels can also collaborate to logically form a larger subpanel to serve a larger user group.

FIG. 11 illustrates an example of assignment of user groups to subpanels according to various embodiments of the present disclosure. As shown in FIG. 11, the subpanels 702 of FIG. 7C are assigned to the user groups 804-806 of FIG. 8. In this example, the top two subpanels 702 collaborate to logically form a larger subpanel 1102. The user group 804, which is the largest user group, is served by the larger subpanel 1102. Each of the other user groups 805 and 806 is served by one of the bottom two subpanels 702. Thus, each user group 804-806 is served by one subpanel 702 (or by the larger subpanel 1102 logically formed by two subpanels 702). Because of that, the data for each UE only goes through one subpanel, instead of all the subpanels.

Once the BS 102 assigns the user groups to the subpanels, the BS 102 performs operation 507, in which the BS 102 transmits data to, and receives data from, the UEs in the assigned user groups. The communication between the BS 102 and the UEs occurs via the assigned subpanels such that each user group is served by one subpanel among the multiple subpanels. In communicating with the UEs, the BS 102 performs CSI acquisition, channel estimation, scheduling, analog precoding, and digital precoding independently for each subpanel.

Channel Estimation.

In some embodiments, the BS 102 could use SRS or Precoding Matrix Index (PMI) to estimate the channel of group-partitioned MU-MIMO. In some embodiments, the BS 102 only has to estimate the channel between the subpanel and the user group(s) assigned to that subpanel. In one option, the BS 102 transmits CSI-RS to the assigned user group(s) via the subpanel. The UEs of the assigned user group(s) feedback one or more channel estimation parameters (for example, PMI) to the BS 102. The channel estimation parameters should be for the subpanel, not the whole panel. The BS 102 can then use the channel estimation parameters to estimate the channel between the user group(s) and the subpanel. In another option, the UE transmits the SRS, and the BS 102 only receives the SRS signal in the assigned subpanel and estimates the channel.

Hybrid Analog and Digital Precoding.

In some embodiments, the BS 102 could adopt hybrid analog and digital precoding in the massive MIMO case.

Assume that there are $N_{TRX}$ transceivers and $N_{Ant}^{BS}$ antennas in the whole antenna panel (e.g., the antenna panel 600 or 900). The antenna panel transmits $N_{layer}$ layers of data to $N_{UE}$ UEs, where each UE is equipped with $N_{Ant}^{UE}$ antennas. The received signals at the $N_{UE}$ UEs can be represented by the following:

$$y = HF_{RF}F_{BB}x + n,$$

where:

$F_{RF} \in \mathbb{C}^{N_{Ant}^{BS} \times N_{TRX}}$ is the analog precoding;

$F_{BB} \in \mathbb{C}^{N_{TRX} \times N_{layer}}$ is the digital precoding;

$H \in \mathbb{C}^{N_{UE} N_{Ant}^{UE} \times N_{Ant}^{BS}}$ is the channel;

$x \in \mathbb{C}^{N_{layer} \times 1}$ is the symbol transmitted by the BS;

$y \in \mathbb{C}^{N_{UE} N_{Ant}^{UE} \times 1}$ is the received symbols by the UEs; and $n \in \mathbb{C}^{N_{UE} N_{Ant}^{UE} \times 1}$ is the noise.

Assume the antenna panel is partitioned into M subpanels. There are $N_{TRX,i}$ transceivers within the i-th subpanel, and the number of data layers served by the i-th subpanel is $N_{layer,i}$. Note that $$\sum_{i=1}^{M} N_{TRX,i} = N_{TRX} \text{ and } \sum_{i=1}^{M} N_{layer,i} = N_{layer}.$$

The baseband digital precoder $F_{BB}$ is a block-diagonal matrix, such as the following:

$$F_{BB} = \begin{bmatrix} F_{BB,1} & 0 & \cdots & 0 \\ 0 & F_{BB,2} & \cdots & 0 \\ \vdots & \vdots & \ddots & 0 \\ 0 & 0 & \cdots & F_{BB,M} \end{bmatrix},$$

where $F_{BB,i} \in \mathbb{C}^{N_{TRX,i} \times N_{layer,i}}$ is the digital precoder for the i-th subpanel.

Similarly, the analog precoder $F_{RF}$ is also a block-diagonal matrix, such as the following:

$$F_{RF} = \begin{bmatrix} F_{RF,1} & 0 & \cdots & 0 \\ 0 & F_{RF,2} & \cdots & 0 \\ \vdots & \vdots & \ddots & 0 \\ 0 & 0 & \cdots & F_{RF,M} \end{bmatrix},$$

where $F_{RF,i} \in \mathbb{C}^{N_{Ant,i} \times N_{TRX,i}}$ is the analog precoding of the i-th subpanel.

Digital Precoding.

If the zero-forcing digital precoding is adopted, the computational complexity of $F_{BB,i}$ is given as:

$$O(N_{layer,i}^3 M) = O\left(\left(\frac{N_{layer}}{M}\right)^3 M\right) = O\left(\frac{N_{layer}^3}{M^2}\right).$$

In contrast, if the users are not grouped, the computational complexity of $F_{BB} \in \mathbb{C}^{N_{TRX} \times N_{layer}}$ is $O(N_{layer}^3)$. Hence, the group-partitioned MU-MIMO can reduce complexity by a factor of $M^2$. If M is large, the computational complexity of zero-forcing precoding is significantly reduced.

In some embodiments, the digital precoding is designed to reduce or eliminate the intra-subpanel interference. The digital precoding could be zero-forcing (ZF) or regularized zero-forcing (RZF). While ZF works well in high SNR cases, RZF is slightly better than ZF in low SNR cases. In another option, the maximum ratio transmission (MRT) can be adopted if there are only a few UEs, i.e., the number of UEs is much less than the number of antennas in the subpanel. MRT precoding has lower complexity than ZF and RZF since MRT requires no computation of matrix inversion.

Although the majority of the inter-subpanel interference is eliminated by the analog beams, the residual interference could still cause issues for high modulation transmission, for example, 256-QAM. In some embodiment, the BS 102 could perform digital precoding jointly across the subpanels. In one option, the block diagonalization (BD) method could be adopted to eliminate the inter-subpanel interference. The BS 102 first designs a digital pre-beamformer which depends only on long-term CSI and takes responsibility of group-wise user separation by using BD methods. Then, the BS 102 designs a digital precoder to manage the intra-subpanel interference with short-term CSI.

Analog Precoding.

In some embodiments, the BS 102 designs the analog precoding such that each subpanel covers a spatial zone with minimal overlap with the other subpanels. FIGS. 12A-12C illustrate various example analog beam coverage zones with minimal or no overlap according to various embodiments of the present disclosure.

In other embodiments, the analog precoding could be made the same across the sub-arrays in the same subpanel. That means that nonzero elements of $F_{RF,i}$ is the same across the columns as shown in the following matrix:

$$F_{RF,i} = \begin{bmatrix} f_{RF,i} & 0 & \cdots & 0 \\ 0 & f_{RF,i} & \cdots & 0 \\ \vdots & \vdots & \ddots & 0 \\ 0 & 0 & \cdots & f_{RF,i} \end{bmatrix},$$

where $f_{RF,i} \in \mathbb{C}^{N_{Ant}^{SA} \times 1}$ is the analog precoding and $N_{Ant}^{SA}$ is the number of antennas in a sub-array.

In some embodiments, the analog precoding is designed according to the long-term channel state information (for example, the second-order statistics), while the digital precoding is generated based on the instantaneous knowledge of the channel state information.

In some embodiments, the distributed unit (DU) sends information on analog beamforming weight vectors to one or more radio units (RUs), one analog beamforming weight vector per subpanel, along with information on the total number of subpanels and how the subpanels are logically partitioned.

Figure 13:
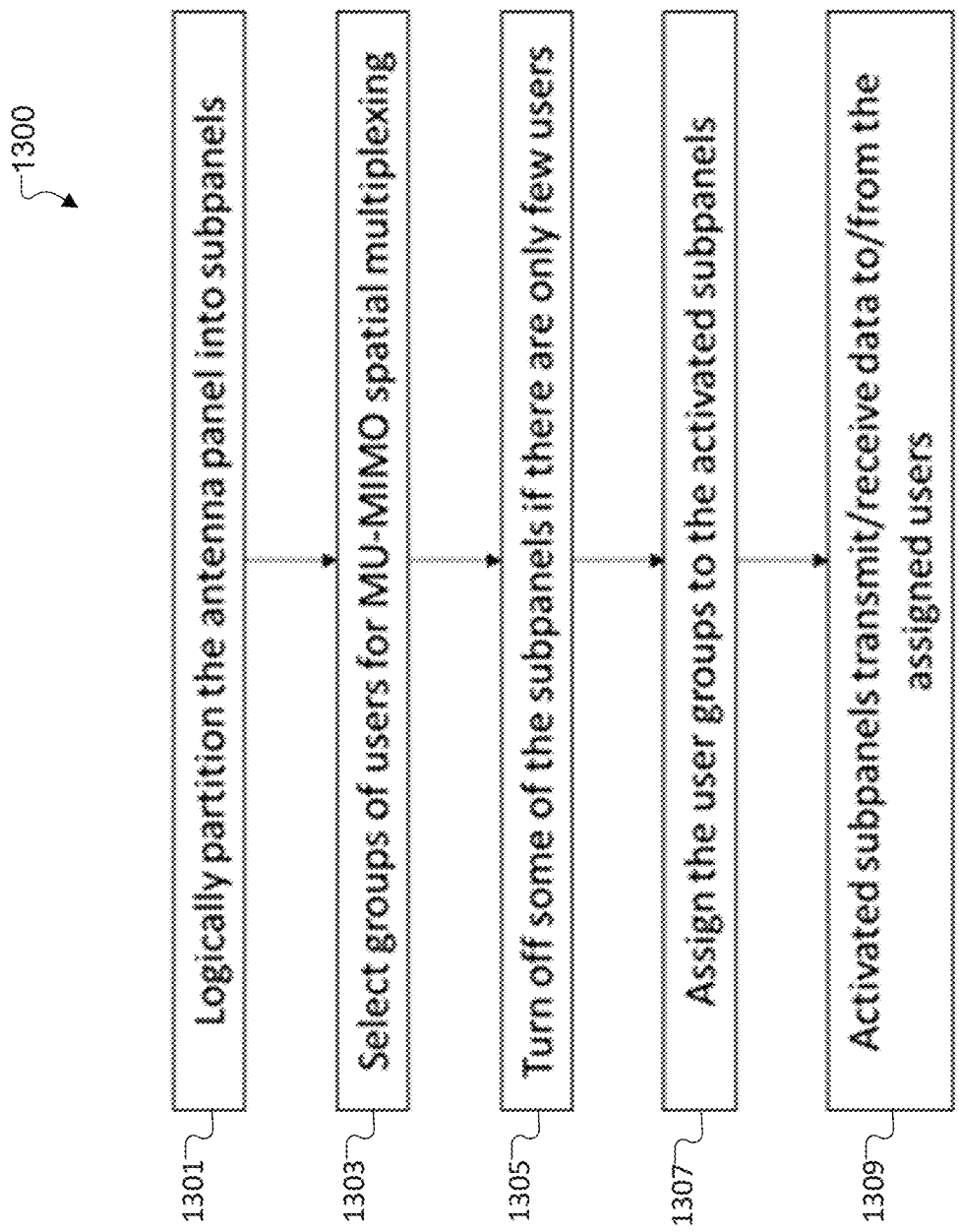
FIG. 13 illustrates another example process for group partitioning in a MU-MIMO system according to embodiments of the present disclosure.

FIG. 13 illustrates another example process 1300 for group partitioning in a MU-MIMO system according to various embodiments of the present disclosure. In the process 1300, the BS 102 adaptively turns subpanels on and off based on the traffic level. The embodiment of the process 1300 shown in FIG. 13 is for illustration only. Other embodiments of the process 1300 could be used without departing from the scope of this disclosure. For ease of explanation, the process 1300 will be described as being implemented using the BS 102 of FIG. 1. However, the process 1300 could be implemented in any other suitable device.

As shown in FIG. 13, the process 1300 includes multiple operations that are the same as, or similar to, corresponding operations in the process 500 of FIG. 5. At operation 1301, the BS 102 logically partitions its antenna panel into multiple subpanels. At operation 1303, the BS 102 selects user groups for MIMO multiplexing.

The process 1300 also includes operation 1305, in which the BS 102 turns off a set of subpanels to reduce overall power consumption in low-to-medium traffic conditions. For example, if the BS 102 determines that a total number of active UEs in the user groups is less than a predetermined threshold number (e.g., there are only a few active UEs in the cell), the BS 102 can turn on only one subpanel and turn off the other subpanels for power saving purposes.

In some embodiments, the BS 102 can turn off more subpanels in the downlink, but turn off fewer subpanels or no subpanels in the uplink. The uplink is usually the bottleneck of the cell coverage because of the lower transmission power by the UEs than by the BS 102. For that reason, the BS 102 could turn on more subpanels in the uplink transmission to extend the uplink coverage.

At operation 1307, the BS 102 assigns the user groups to the subpanels. Then, at operation 1309, the BS 102 transmits data to, and receives data from, the UEs in the assigned user groups.

Although FIGS. 5 through 13 illustrate various processes and details related to group partitioning in a multi-user MIMO system, various changes may be made to FIGS. 5 through 13. For example, various components in FIGS. 5 through 13 could be combined, further subdivided, or omitted and additional components could be added according to particular needs. In addition, various operations in FIGS. 5 through 13 could overlap, occur in parallel, occur in a different order, or occur any number of times.

Figure 14:
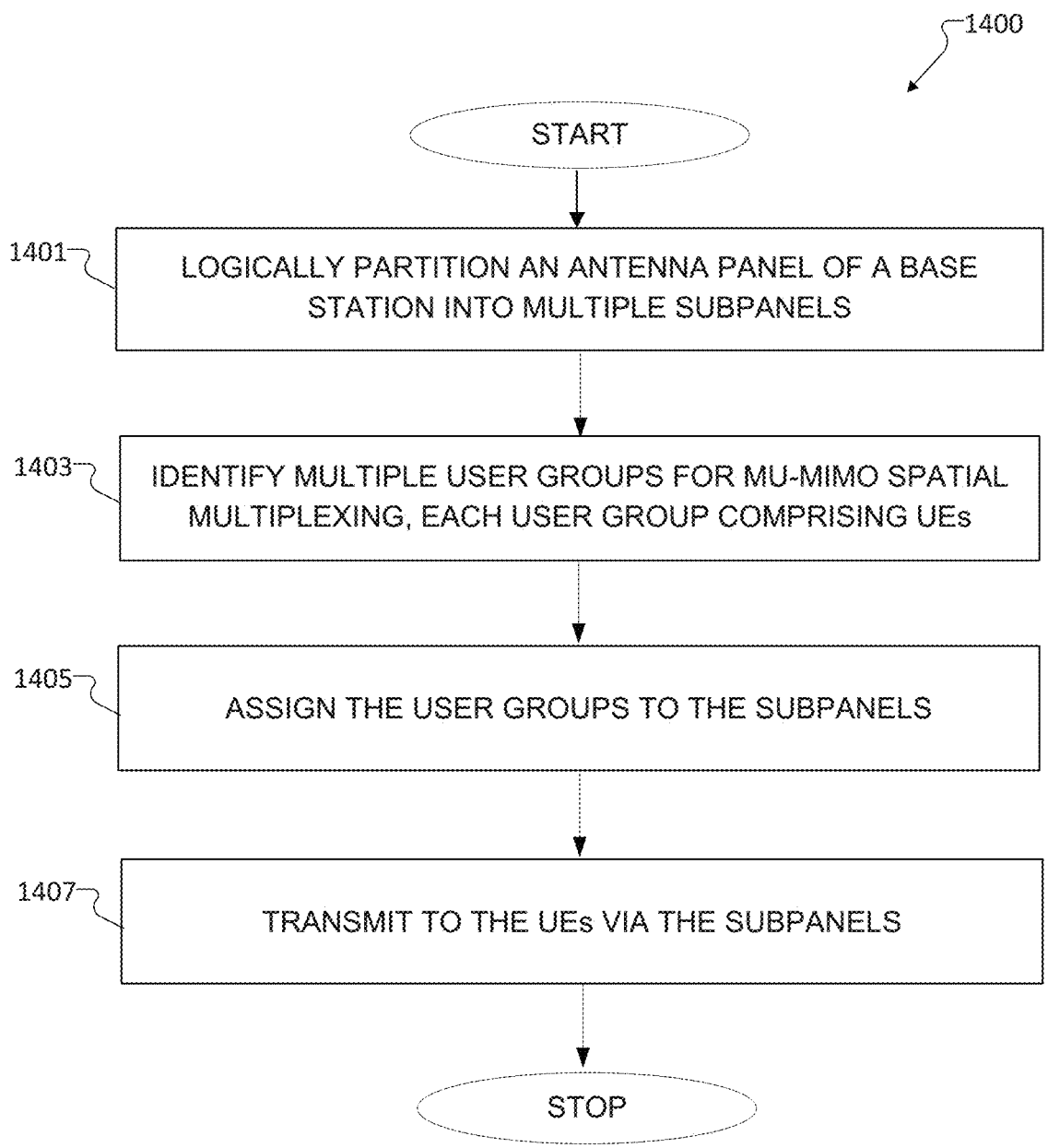
FIG. 14 illustrates a method for group partitioning in a multi-user MIMO system according to embodiments of the present disclosure.

FIG. 14 illustrates a method 1400 for group partitioning in a multi-user MIMO system according to embodiments of the present disclosure, as may be performed by one or more components of the network 100 (e.g., the BS 102). The embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the method 1400 begins at step 1401. At step 1401, a BS logically partitions an antenna panel of a base station into multiple subpanels. This could include, for example, the BS 102 performing operation 501 to partition the antenna panel 600 into multiple subpanels 702.

At step 1403, the BS identifies multiple user groups for MU-MIMO spatial multiplexing, where each user group includes one or more UEs. This could include, for example, the BS 102 performing operation 503 to identify the user groups 804-806, which include the UEs 802.

At step 1405, the BS assigns the user groups to the subpanels. This could include, for example, the BS 102 performing operation 505 to assign the user groups 804-806 to the subpanels 702, such as shown in FIG. 11.

At step 1407, the BS transmits to the UEs via the subpanels. This could include, for example, the BS 102 performing operation 507, in which the BS 102 transmits data to, and receives data from, the UEs 802 in the assigned user groups 804-806.

Although FIG. 14 illustrates one example of a method 1400 for composite beam operation and overhead reduction, various changes may be made to FIG. 14. For example, while shown as a series of steps, various steps in FIG. 14 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   logically partitioning an antenna panel of a base station into multiple subpanels;
   identifying multiple user groups for multi-user multiple-input multiple-output (MU-MIMO) spatial multiplexing, each user group comprising one or more user equipments (UEs);
   assigning the multiple user groups to the multiple subpanels comprising at least one activated panel associated with a number of UEs in each user group; and
   transmitting, to the one or more UEs via the multiple subpanels, signals,
   wherein each user group is served by a single subpanel among the multiple subpanels.

2. The method of claim 1, wherein logically partitioning the antenna panel into the multiple subpanels comprises logically dividing the antenna panel into one of:
   a vertical direction,
   a horizontal direction, or
   the vertical direction and the horizontal direction.

3. The method of claim 1, wherein identifying the multiple user groups comprises partitioning the one or more UEs into the multiple user groups based on at least one of:
   a distance between each UE of the one or more UEs and the base station; and
   an azimuth angle of each UE of the one or more UEs with respect to the base station.

4. The method of claim 1, wherein transmitting, to the one or more UEs via the multiple subpanels, the signals comprises:
   performing channel state information (CSI) acquisition, scheduling, analog precoding, and digital precoding independently for each subpanel of the multiple subpanels.

5. The method of claim 4, wherein the digital precoding is performed to reduce or eliminate intra-subpanel interference.

6. The method of claim 4, wherein the analog precoding comprises is an operation such that each subpanel covers a spatial zone with a minimal overlap with other subpanels.

7. The method of claim 1, wherein transmitting, to the one or more UEs via the multiple subpanels, the signals comprises:
   transmitting channel state information (CSI) to a first user group among the multiple user groups via the single subpanel assigned to the first user group;
   receiving one or more channel estimation parameters from the one or more UEs of the first user group via the single subpanel assigned to the first user group; and
   estimating a channel between the first user group and the single subpanel assigned to the first user group.

8. The method of claim 1, further comprising, in response to determining that a total number of UEs in the multiple user groups is less than a predetermined threshold number, turning off at least one of the multiple subpanels in order to save power.

9. A device comprising:
a transceiver; and
a processor operably connected to the transceiver, the processor configured to:
- logically partition an antenna panel of a base station into multiple subpanels;
- identify multiple user groups for multi-user multiple-input multiple-output (MU-MIMO) spatial multiplexing, each user group comprising one or more user equipments (UEs);
- assign the multiple user groups to the multiple subpanels comprising at least one activated panel associated with a number of UEs in each user group; and
- transmit, to the one or more UEs via the multiple subpanels, signals,
- wherein each user group is served by a single subpanel among the multiple subpanels.

10. The device of claim 9, wherein the processor is further configured to logically divide the antenna panel into one of:
a vertical direction,
a horizontal direction, or
the vertical direction and the horizontal direction.

11. The device of claim 9, wherein the processor is further configured to partition the one or more UEs into the multiple user groups based on at least one of:
a distance between each UE of the one or more UEs and the base station; and
an azimuth angle of each UE of the one or more UEs with respect to the base station.

12. The device of claim 9, wherein the processor is further configured to:
perform channel state information (CSI) acquisition, scheduling, analog precoding, and digital precoding independently for each subpanel of multiple subpanels.

13. The device of claim 12, wherein the processor is further configured to reduce or eliminate intra-subpanel interference.

14. The device of claim 12, wherein the processor is further configured to perform an operation such that each subpanel covers a spatial zone with minimal overlap with other subpanels.

15. The device of claim 9, wherein the processor is further configured to:
transmit channel state information (CSI) to a first user group among the multiple user groups via the single subpanel assigned to the first user group;
receive one or more channel estimation parameters from the one or more UEs of the first user group via the single subpanel assigned to the first user group; and
estimate a channel between the first user group and the single subpanel assigned to the first user group.

16. The device of claim 9, wherein the processor is further configured to, in response to determining that a total number of UEs in the multiple user groups is less than a predetermined threshold number, turn off at least one of the multiple subpanels in order to save power.

17. A non-transitory computer readable medium comprising program code that, when executed by a processor of a device, causes the device to:
- logically partition an antenna panel of a base station into multiple subpanels;
- identify multiple user groups for multi-user multiple-input multiple-output (MU-MIMO) spatial multiplexing, each user group comprising one or more user equipments (UEs);
- assign the multiple user groups to the multiple subpanels comprising at least one activated panel associated with a number of UEs in each user group; and
- transmit, to the one or more UEs via the multiple subpanels, signals,
- wherein each user group is served by a single subpanel among the multiple subpanels.

18. The non-transitory computer readable medium of claim 17, wherein the program code to logically partition the antenna panel into the multiple subpanels comprises program code to logically divide the antenna panel into one of:
a vertical direction,
a horizontal direction, or
the vertical direction and the horizontal direction.

19. The non-transitory computer readable medium of claim 17, wherein the program code to identify the multiple user groups comprises program code to partition the one or more UEs into the multiple user groups based on at least one of:
a distance between each UE of the one or more UEs and the base station; and
an azimuth angle of each UE of the one or more UEs with respect to the base station.

20. The non-transitory computer readable medium of claim 17, wherein the program code to transmit, to the one or more UEs via the multiple subpanels, signals comprises program code to:
perform channel state information (CSI) acquisition, scheduling, analog precoding, and digital precoding independently for each subpanel of the multiple subpanels.

* * * * *